United States Patent [19]
Rascle et al.

[11] Patent Number: 5,299,077
[45] Date of Patent: Mar. 29, 1994

[54] DISK PLAYER-RECORDER

[75] Inventors: Roger Rascle, Plaisance Du Touch; Jean-Pierre Rousseau, Toulouse, both of France

[73] Assignee: Art Tech Gigadisc "ATG", Toulouse, France

[21] Appl. No.: 714,939

[22] Filed: Jun. 13, 1991

[30] Foreign Application Priority Data

Jun. 15, 1990 [FR] France .................. 90 07515

[51] Int. Cl.$^5$ ............................................. G11B 5/55
[52] U.S. Cl. ............................ 360/99.02; 360/99.03; 360/99.06; 369/75.2
[58] Field of Search ..................... 369/75.1, 75.2; 360/99.02, 99.06, 99.08, 99.12, 99.09, 99.05, 99.03

[56] References Cited

U.S. PATENT DOCUMENTS

| | | | |
|---|---|---|---|
| 3,833,926 | 9/1974 | Hall | 360/135 |
| 4,509,158 | 4/1985 | Kang | 369/77.2 |
| 4,758,909 | 7/1988 | Harase | 360/99.06 |
| 5,166,918 | 11/1992 | Kamijo | 360/99.06 |

FOREIGN PATENT DOCUMENTS

| | | |
|---|---|---|
| 149532 | 7/1985 | European Pat. Off. . |
| 158360 | 10/1985 | European Pat. Off. . |
| 250111 | 12/1987 | European Pat. Off. . |
| 315256 | 5/1989 | European Pat. Off. . |
| 334446 | 9/1989 | European Pat. Off. . |

*Primary Examiner*—Paul M. Dzierzynski
*Assistant Examiner*—Don Wong
*Attorney, Agent, or Firm*—Oblon, Spivak, McClelland, Maier & Neustadt

[57] ABSTRACT

A disk player-recorder for cartridge disks, the cartridge including a disk mounted in a housing, the player-recorder having a frame which includes an aperture for insertion of the cartridge, a mechanism to set the cartridge to the play and/or record position and a mechanism for transporting the cartridge between the aperture and the cartridge positioning mechanism and vice-versa. The cartridge transport mechanism includes a cartridge support mounted on a player-recorder frame by a pivoting parallelogram system and a mechanism for moving the support with a virtually sinusoidal motion between the aperture and the positioning mechanism.

13 Claims, 5 Drawing Sheets

DISK PLAYER-RECORDER

BACKGROUND OF THE INVENTION

1. Field of the Invention

This invention is a player-recorder in which the recording medium is a disk, particularly a disk cartridge consisting of a disk mounted in a cover. This type of player-recorder is used particularly for optical disks.

2. Discussion of the Background

Disk cartridge player-recorders in which the disk is protected by a cartridge, are well-known in the industry. They are described, in particular, in U.S. Pat. No. 4,736,356. These player-recorders include a mechanism to transport a cartridge from a top position, at which the cartridge is inserted, to a bottom position in which the disk is played and/or recorded or vice-versa. However, known types of player-recorders are a number of disadvantages. The operating cycle lasts several seconds, their life is insufficient for the number of cycles required and the cartridge transport movement is not possible without impacts or wear. Moreover, these player-recorders are increasingly frequently used in conjunction with a robot which moves the cartridge quickly, either to place it in the top-position mechanism or to remove it from this position. This is particularly true when the player-recorder is part of a "juke-box".

SUMMARY OF THE INVENTION

This invention therefore proposes an improvement to the mechanisms used to transport the cartridge inside the player-recorder, which eliminates the disadvantages mentioned above.

This invention also proposes various improvements to the player-recorder itself, firstly to eliminate or minimize damage to the cartridge or its content and, secondly, to allow the cartridge transport mechanism to operate reliably throughout a life of 200,000 to several million cycles.

Consequently, the subject of this invention is a disk player-recorder for cartridge disks consisting of a disk mounted in a cover, said player-recorder including a frame with an aperture to insert the cartridge, positioning means to place the cartridge in the play and/or record position and transporting means to transport the cartridge between the aperture and the cartridge positioning means and vice-versa, in which the cartridge transport means includes a cartridge support mounted on the player-recorder frame by a pivoting parallelogram mechanism and a support drive mechanism to transport the cartridge between the aperture and the positioning mechanism with a virtually sinusoidal motion.

Optical disk cartridges generally include a window to allow the disk to be played and/or recorded. To avoid dust entering the cartridge while the disk is not in use, this window is closed by a moving flap. In known types of player-recorders, a single flap closes both windows on the faces of the disk. Moreover, this flap is opened, either manually or by an automatic system external to the player-recorder, when the cartridge is inserted in the aperture. Consequently, there is no control for the cartridge insertion speed nor, therefore, no safety control with respect to the damage progressively caused to the flap.

To reduce the ingress of dust into the cartridge, another feature of the invention is that two independent flaps are used instead of a single flap and that only one flap—normally the lower flap—is open.

Another feature of the invention, designed to prevent quick damage to the flap, is that the player-recorder also includes a device to open the cartridge flap during transport of the cartridge from the aperture to the positioning means and procuring the advantages of the virtually sinusoidal movement. Consequently, in a preferred embodiment, the cartridge flap opening system includes a finger which engages in the flap opening notch. This finger is mounted on a lever which pivots on a pin integrated with the support and is attached to the frame by a stiff rod pivoting between a pin on the frame and a pin on the lever.

Another feature of the invention is that, to limit the ingress of dust, the player-recorder includes a rotary closure flap in front of the aperture. Opening or closing of this flap is controlled by the position of the cartridge inside the player-recorder.

Another feature of the invention is that, to avoid errors, the closure flap is linked to a lock which is positioned in front of the aperture when a cartridge is inserted into the player-recorder.

Another feature of the invention, to limit ingress of dust into the cartridge when it is in the play and/or record position, is that the player-recorder includes a flexible seal mounted on the frame and surrounding the positioning means.

BRIEF DESCRIPTION OF THE DRAWINGS

Other features and advantages of the invention are highlighted in the description of a preferred embodiment of a disk player-recorder according to this invention and this description is based on the appended drawings of which.

To simplify the description, the same parts are indicated by the same reference numbers in all figures.

DETAILED DESCRIPTION OF THE INVENTION

For any member of the industry, it is obvious that, when we use the term "disk player-recorder" in this invention, we imply both a simple playback device and a system capable of playing and recording disks. The term "disk" applies to any type of optical disk known to the industry.

The cartridge transport invention, will be explained first. Schematically, the mechanism comprises a support on which the cartridge is positioned. This support may be a simple deck or a set of slides attached to a stiffening plate as explained later. This support is mounted on four identical links 2. The links 2 pivot on the and on the player-recorder frame. This achieves a pivoting parallelogram mechanism which allows the support to move, with a combined rotation-translation motion, always parallel to its original position.

This mechanism is combined with a support drive mechanism which gives the support virtually sinusoidal motion, thus guaranteeing that there will be no mechanical shocks. To obtain this virtually sinusoidal motion, the side of the support includes a slot forming a cam in which a roller slides. The roller is mounted at the end of a rod whose other end pivots on the frame. Provided the various components of the transport system and drive mechanism are correctly dimensioned, the motion of the support is therefore virtually sinusoidal and it remains constantly parallel to its original position; in particular, it arrives at the top position, i.e. close to the aperture through which the cartridge is inserted, and at the bottom position, i.e. on the mechanism which positions the cartridge in the play and/or record position, at zero speed.

There are, therefore, no mechanical shocks during cartridge transport.

FIGS. 1 to 6 will now be used to describe a special configuration of a disk player-recorder including a cartridge transport mechanism and a cartridge support drive mechanism complying with this invention.

Figure 1:
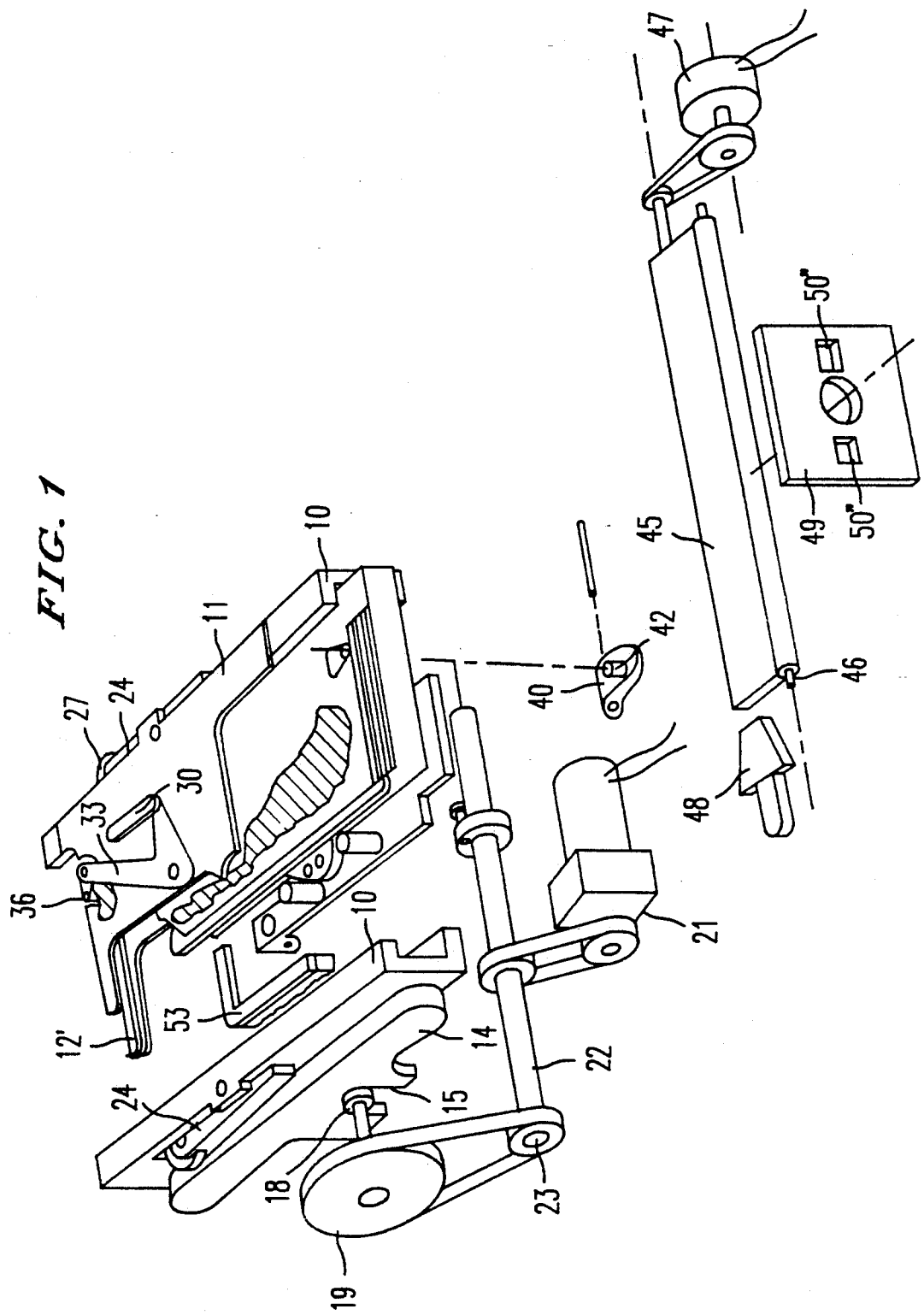
FIG. 1 is a partial perspective view of the main components of a player-recorder complying with this invention.
Figure 3:
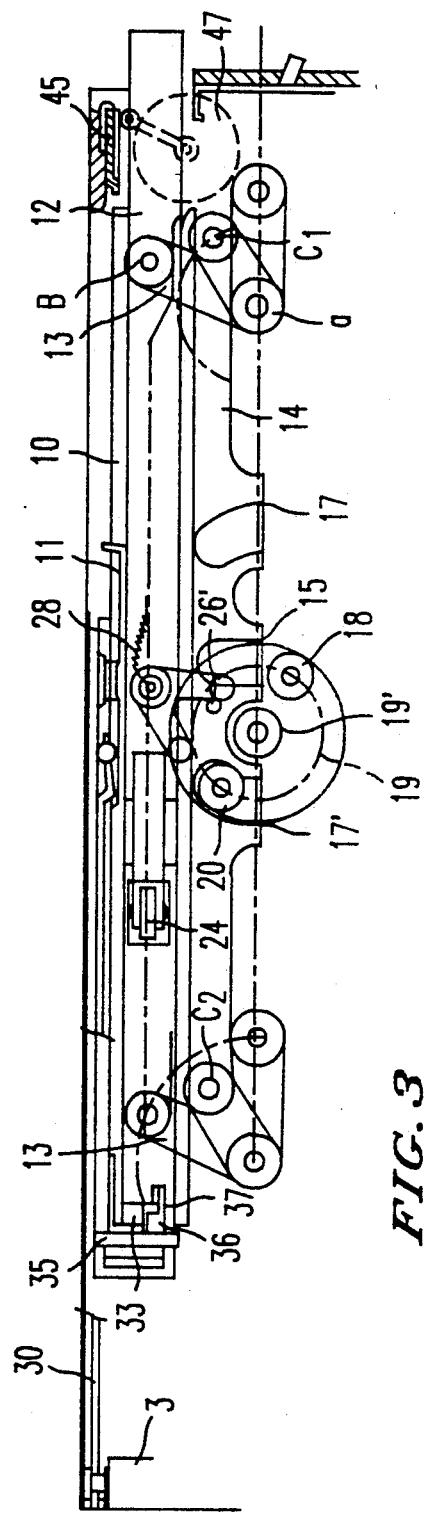
FIGS. 3 and 4 are half-elevational views in the top and bottom positions respectively.
Figure 4:
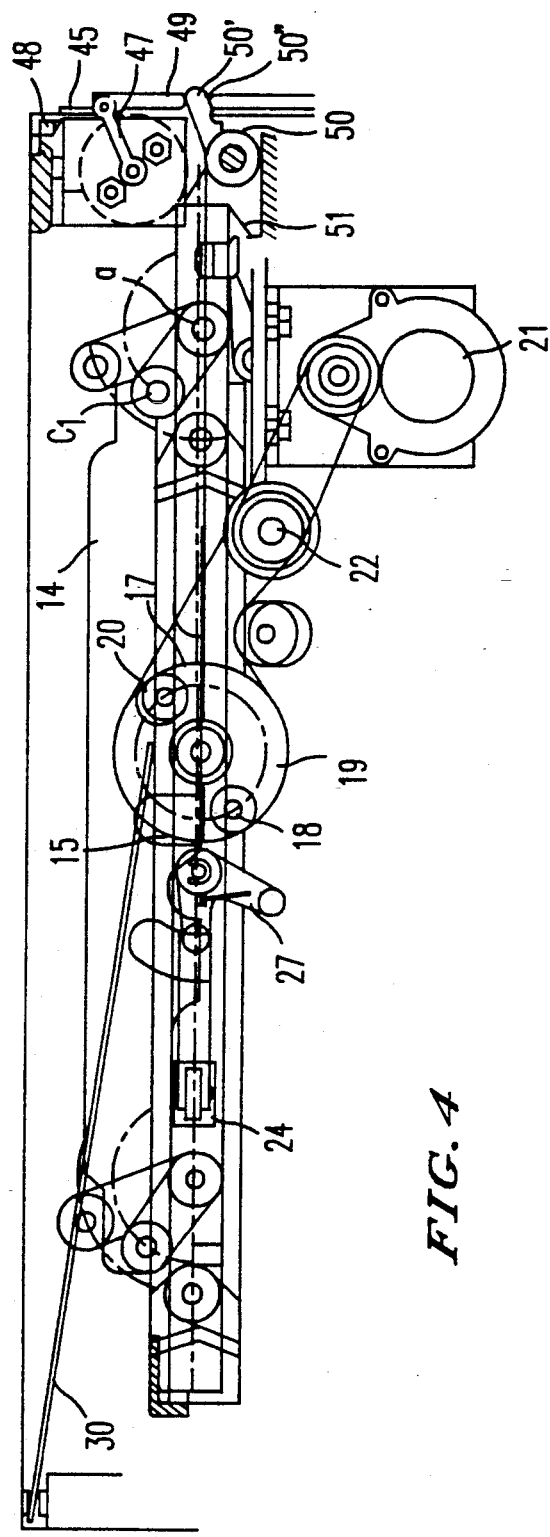

As shown particularly in FIGS. 1, 3 and 4, the support in the configuration represented consists of two slides 10, into which cartridge 12 is inserted, and a stiffening plate 11. Four identical links 13 pivot on a frame 3 at point a and on slides 10 at point b, moving the plate parallel to its original position. The mechanism that imparts a virtually sinusoidal motion to the support mainly consists of two brackets 14 pivoting at points $c_1$ and $c_2$ on links 13 so that the brackets always move parallel to their initial position and to the slides and stiffening plate assembly. To obtain the virtually sinusoidal motion, brackets 14 contain various slots 15, 17 and 17' that act as cams. Rollers 18 and 20, mounted on wheel 19, itself driven by the transmission system described below, engage in these slots. In more precise terms, the sinusoidal movement is produced by roller 18 which slides in the cam slot 15 in the bracket. As shown on FIG. 3, the support, consisting of slides 10 and stiffening plate 11, is locked in the upper position, i.e. the position in which cartridge 12 is inserted, by roller 20 which is symmetrical with roller 18 about the shaft 19' of wheel 19 and engages in circular arc slot 17' in bracket 14. In this position, when wheel 19 is rotated in the direction of arrow f, roller 18 disengages from slot 15 and roller 20 engages in the circular arc cam slot 17. Consequently, as shown on FIG. 4, when roller 20 is completely engaged in cam slot 17, it locks the mechanism in the lower position.

As shown particularly on FIGS. 1 and 4, the transmission system mainly consists of a motor or motor/gearbox 21 driving shaft 22 through a pulley and belt system. Shaft 22 also transmits the movement to wheels 19 through a pulley and belt system. As shown in FIG. 1, the end of shaft 22 can include a slot to allow the shaft to be rotated with a screwdriver and thus release the system in the event of an electrical supply failure.

In the embodiment shown, slides 10 can be in plastic or treated metal and/or carry rollers to minimize friction and wear and thus achieve the required life.

As shown in FIGS. 1 to 4, the cartridge transport system also includes a cartridge locking device 27 designed to lock the cartridge in the slides in the upper or aperture position before the assembly starts to move to the lower position, i.e. the play/record position in the configuration shown. Locking system 24 holds the cartridge in the slide as the support drive mechanism accelerates. Locking system 24 is installed on the slide on each side as shown in FIG. 3. It mainly comprises a locking lever 25 which pivots horizontally on a pin in slide 10. The lever inserts a roller 27 into a V-notch 24' provided in the side of cartridge 12. A lock 26 pivots vertically on a pin in slide 10 and tips the lever to hold it in position to lock the cartridge. When the cartridge transport system is in the top position and against the stop, i.e. when roller 20 abuts against the bottom of the cam slot 17, lock 26 is prevented from locking the lever by a pin 26' mounted on wheel 19. Consequently, the cartridge can be freely inserted or removed. As soon as wheel 19 starts turning to drive the transport system and the drive towards the bottom position or play and/or record position, pin 26' releases the lock which, under the action of its spring 28, immediately prevents the lever pivoting and thus locks the cartridge in position as shown on FIG. 4. With this system, the cartridge is only released when the transport system and drive system returns completely to the top position.

Figure 2:
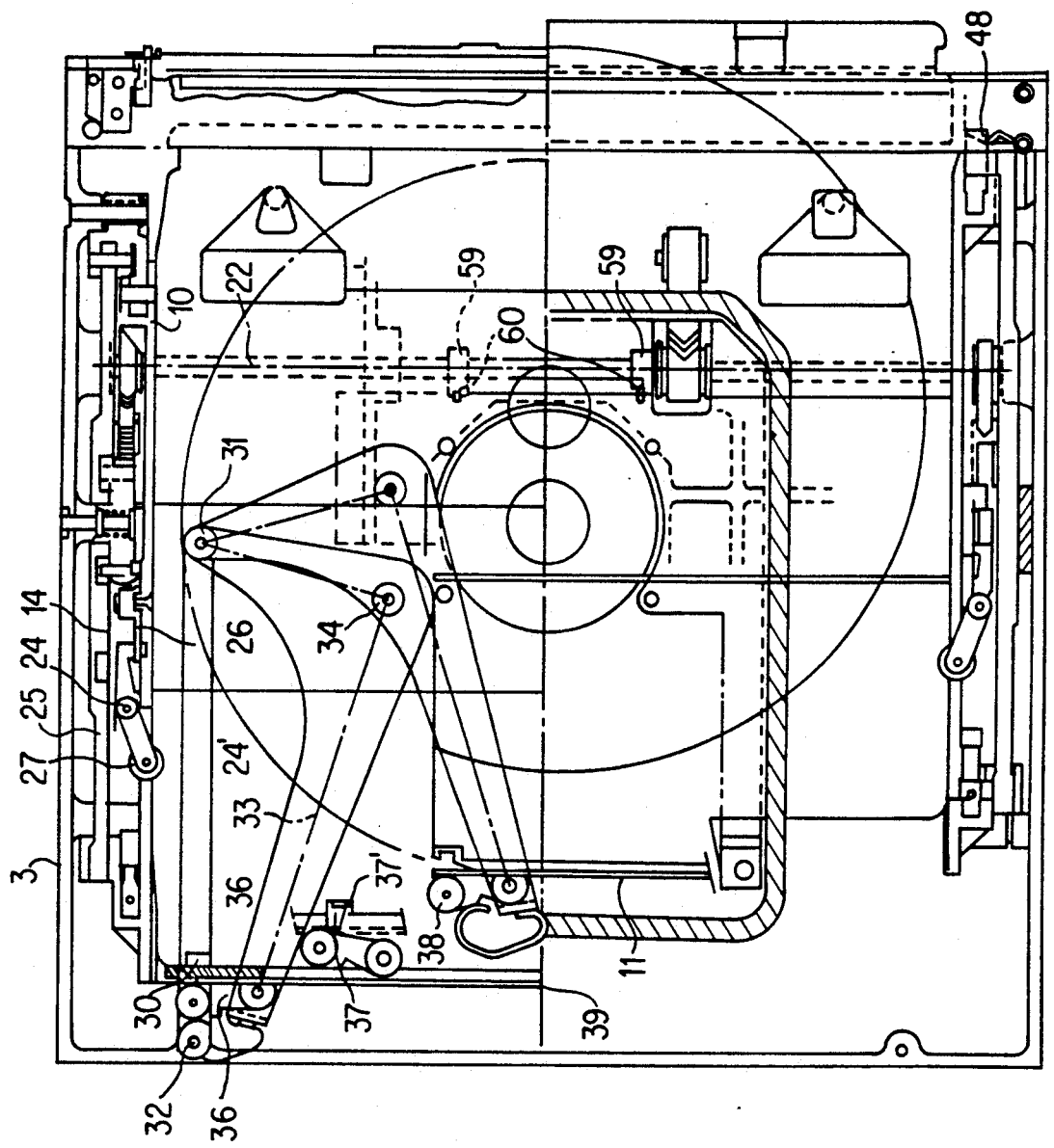
FIG. 2 is a plan view showing the cartridge and transport mechanism in the top and bottom positions respectively.

The following is a description, referring particularly to FIG. 2, of a preferred configuration of a device to open the cartridge flap which operates the flap as it is transported between the player-recorder insertion aperture in the top position and the positioning system or lower position. As shown on FIG. 2, the opening system mainly comprises a lever 33 pivoting about pin 34 on the stiffening plate 11. A link 36 is mounted on one end of lever 33, pivoting about pin 35. The other end of link 36 carries a finger 37 which engages in notch 37' provided in the cartridge flap. The other end of lever 33 pivots on pin 31 on the end of a rigid rod 30 whose other end pivots on pin 32 on frame 3. This arrangement means the lever rotates as the cartridge support moves. As shown on FIG. 2, link 36 also carries a roller 38 and a return spring 39 which keeps roller 38 pressed against stiffening plate 11. Roller 38 is linked to finger 37. The spring and roller retract finger 37, possibly such that it no longer makes contact at all, and reduces the wear due to spring load at the contact point between finger 37 and stiffening plate 11. In addition, FIG. 2 schematically shows three positions of the cartridge part at the flap notch position, to illustrate the operation of the cartridge flap opening system.

For a member of the industry, it is obvious that the system described above is an illustration only and that, in particular the assembly consisting of link 36, finger 37, roller 38 and spring 39 can be replaced by another flap opening mechanism such as a carriage moving along the stiffening plate, following the motion of the support drive mechanism.

Figure 5:
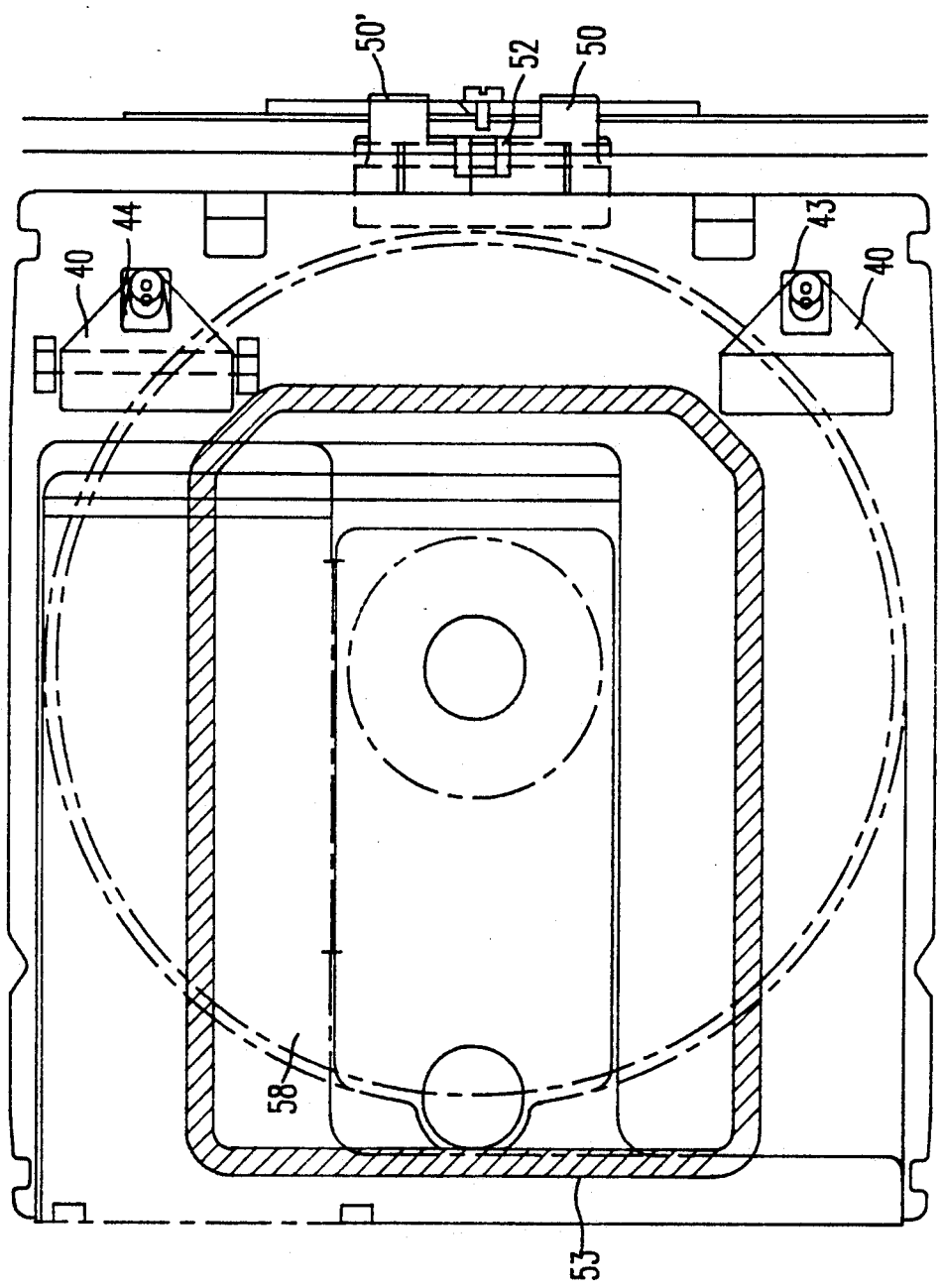
FIG. 5 is a plan view which, in particular, illustrates how the cartridge is progressively centered
Figure 6:
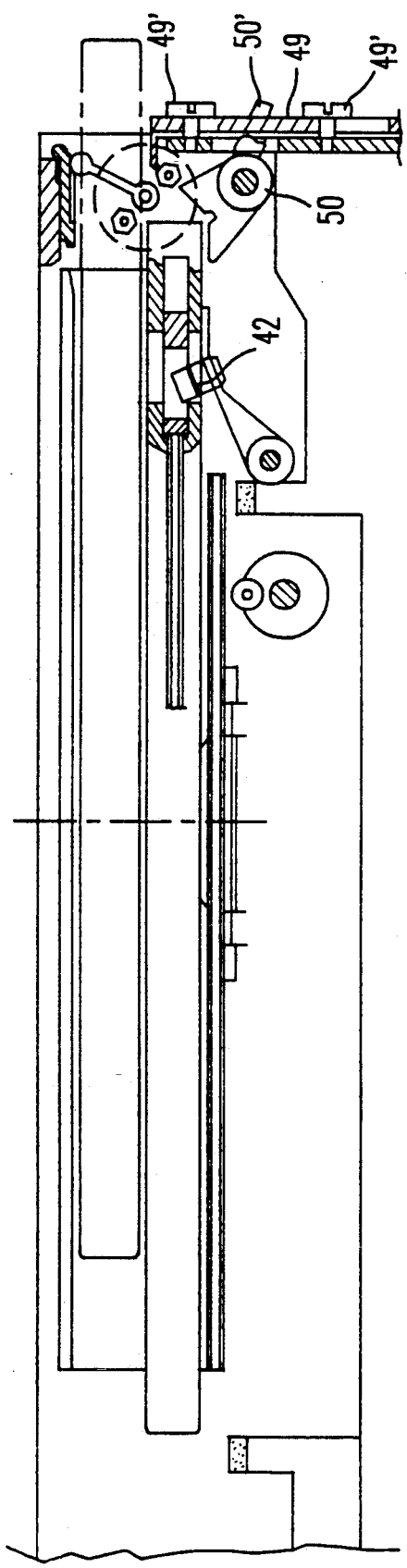
FIGS. 6 and 7 are half-elevational views which, in particular, show the player-recorder aperture flap and the disk extractor system.
Figure 7:
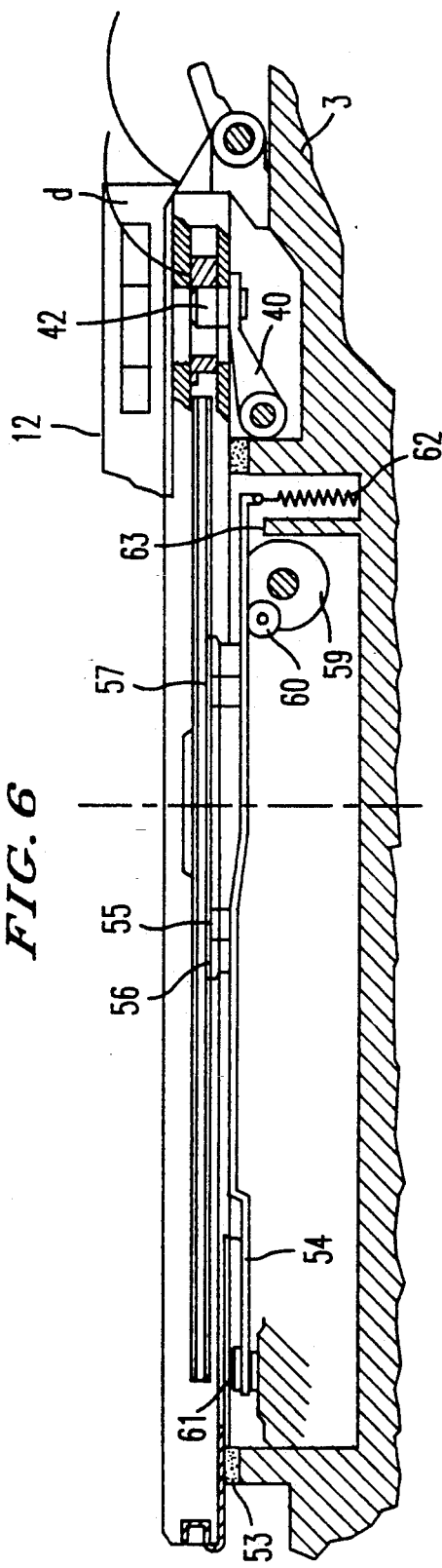

In addition, as shown on FIGS. 1, 5 and 6, the player-recorder described in this invention includes a system to progressively center the cartridge. This system consists of centering devices in the player-recorder and rectangular and triangular notches provided on the cartridge itself. FIGS. 5 and 7 show cartridge 12 in the approach position d. As shown in FIGS. 6 and 7, the player-recorder progressive centering system 40 consists of rotating lugs and a return spring mounted on frame 3, each with a centering shape, preferably roller 42 to limit wear, at their ends. Two centering systems as described above are included on either side of the player-recorder aperture. These centering systems 40 engage in notches provided in the cartridge. As shown on FIG. 5, the centering mechanisms 40 engage in a rectangular notch 43 and a triangular notch 44 respectively.

In addition, as shown on FIGS. 1, 3, 4, 6 and 7, the player-recorder described in this invention includes a flap to cover the aperture in the player-recorder and a locking system. The aperture covering flap consists mainly of plate 45 which rotates about shaft 46. The flap works with an electromagnet 47 and a sensor 48. The closing flap described above operates as follows. When a cartridge is inserted, flap 47 is initially vertical but, as the cartridge 12 is inserted, opens freely to a nearly horizontal position. Sensor 48 then detects that the flap is in this position and applies a voltage to rotary electromagnet 47 causing the electromagnet arm to rotate and place the flap completely horizontal as shown on FIG. 3. Consequently, the flap no longer rubs against the cartridge during the remainder of the insertion movement nor as the transport mechanism, complying with this invention, lowers the cartridge. When a sensor, not shown, detects that the cartridge is in the lower position, as shown on FIG. 4, it deletes the voltage applied to the electromagnet, thus releasing flap 45 which then closes, and is held closed, by a spring not shown.

In a configuration complying with this invention, there is a closure flap lock which prevents cartridges being inserted into the player-recorder when there is already a cartridge in the lower position. As shown on FIGS. 1, 4, 6 and 7, this lock consists of plate 49 which slides vertically, guided in a vertical slot in plate 49 by two shouldered screws 49' attached to the frame. A double extension 50' of moving stop 50 engages in two notches 50'' in lock plate 49. Mobile stop 50 is L-shaped and includes a free end 51. It is held in position by a spring 52 as shown on FIG. 5. The lock operates as follows. If there is no cartridge in the player-recorder, stop 50 is positioned as shown on FIG. 6 by a spring and plate 49 is in the lower position. A cartridge can therefore be inserted into the player-recorder aperture. Once the drive mechanism has transported the cartridge to the lower position, the cartridge bears against part 51 of stop 50, tilting it downwards and thus moving plate 49 to the position shown on FIG. 4. In this position, the lock prevents introduction of another cartridge into the mechanism.

As shown on FIGS. 1, 2, 5, 6 and 7, a player-recorder complying with this invention also includes a system to minimize the ingress of dust into the cartridge. This system consists of a flexible seal 53 mounted on the player-recorder frame 3. This flexible seal 53 is positioned to be applied around the periphery of the flap opening as clearly shown on FIG. 5. This forms a restricted chamber around the flap window and thus prevents the ingress of dust which cannot accumulate in this volume and, therefore, cannot be projected onto cartridge internal components by the "spinner" effect of the rotating disk. In addition, and above all, it prevents the constant ingress of dust from the outside due to the constant renewal of air via the window, which occurs in disks not complying with this invention because the flap is open to the surrounding air under normal conditions.

In addition, as shown particularly on FIGS. 1, 2 and 7, the player-recorder includes a disk extractor system. Extractor 54 includes four pads 55 to support the disk. These pads are mounted around the central spindle 56 and are applied to the disk 57 via window 58 in the cartridge. Window 58 is open since the cartridge flap 12' is also open. Transmission shaft 22 carries two cams 59 fitted with bearings 60 to transmit the force to extractor 54 without loading other parts. The other end of extractor 54 pivots on frame 3 on two screws 61. If no load is applied by the cams and bearings 60, two springs 62 hold the extractor against frame stop 63. The extractor system therefore acts only on the disk, and not the cartridge, both when it is fed onto the central spindle and when it is released from it. It must be remembered that the disk in the cartridge, when in the lower position, must be placed on a central rotating spindle driven by a motor. To support the disk while it rotates on the spindle, a magnetic force is applied between magnets on the rotating spindle and a metal ring on the disk. A system—the disk extractor system—is therefore used to prevent the cartridge and the transport mechanism components from transmitting the loads due to this magnetic force. This system operates in the few millimeters of airgap where the force considerably exceeds the loads applied by the mechanism throughout the motion. The disk extractor system described above considerably increases the system life and reduces costs, requiring only a reinforcement of the extractor system which is more heavily loaded.

The improvements to a disk player-recorder described above offer many advantages. In particular, the drive and transmission systems allow simple rotational motions to be used and, because the drive is through rollers working in slots which act as cams, there are no mechanical shocks during transport of the cartridge nor when it is placed in or removed from the top and bottom positions. In addition, by virtue of its principle and the fact that it is coupled to the transmission system, the cartridge flap opening mechanism ensures certain and reliable opening of the flap. In addition, the configuration of the introduction aperture flap and the lock prevent the introduction of several cartridges simultaneously and considerably reduce the ingress of dust into the player-recorder.

What is claimed is:

1. A cartridge disk player-recorder in which the cartridge comprises a disk mounted in a cover, said player-recorder comprising:
   a frame with an aperture for insertion of the cartridge,
   a mechanism for positioning the cartridge in one of a playing and recording position, and a transporter for transporting the cartridge between the aperture and the cartridge positioning mechanism and vice-versa, wherein the transporter includes a cartridge support mounted on the frame by a pivoting parallelogram mechanism, and
   a drive mechanism for moving the support, between the aperture and the positioning mechanism, with a substantially sinusoidal motion.

2. A player-recorder as claimed in claim 1 in which the cartridge support comprises a plate mounted on at least three links pivoted on the frame.

3. A player-recorder as claimed in claim 2, wherein the cartridge support comprises a stiffening plate, two lateral slides connected to said stiffening plate and a plurality of links for pivoting the slides on the frame.

4. A player-recorder as claimed in claim 1 which comprises a roller wherein the support has a cam slot, wherein the drive mechanism comprises at least one rod with one end pivoted on the frame and a second end, said second end carrying said roller so as to be movable in said cam slot in the support and a transmission and motor for rotating the rod.

5. A player-recorder as claimed in claim 1 which comprises a transmission having at least one roller mounted thereon wherein the drive mechanism comprises at least two links and at least one bracket pivoted from the support by said at least two links, said bracket including first and second slots, each of said slots comprising a cam for said at least one roller for imparting a sinusoidal motion to the bracket.

6. A player-recorder as claimed in claim 5 wherein said bracket has a plurality of cam slots formed therein and wherein a second roller is fixed on a wheel for engaging the cam slots in the bracket so that the drive mechanism is locked in position.

7. A player-recorder as claimed in claim 1, which comprises a device for opening the cartridge flap which operates the flap as the cartridge is transported between said aperture of said valve and said mechanism for positioning the cartridge.

8. A player-recorder as claimed in claim 7 which comprises an aperture device which includes a finger member that engages in a flap slot notch and is mounted on a lever that pivots on a pin on the support and is connected to the frame by a rigid rod pivoting between a first pin on the frame and a second pin on the lever.

9. A player-recorder as claimed in claim 8 in which the pin is mounted at the end of a link that pivots on the lever and is loaded by a spring to engage in the flap opening notch.

10. A player-recorder as claimed in claim 1 wherein a rotating flap is mounted in front of the aperture, such that opening and closing of said flap is controlled by the position of the cartridge inside the player-recorder.

11. A player-recorder as claimed in claim 10 in which opening and closing of said flap is controlled by an electromagnet operated by at least two sensors.

12. A player-recorder as claimed in claim 10 which comprises a lock for fixing the aperture flap in front of the aperture after insertion of a cartridge into the player-recorder.

13. A player-recorder as claimed in claim 1 which comprises a flexible seal mounted on the frame and surrounding the positioning mechanism.

* * * * *